R. PRONK.
LITTER CARRIER.
APPLICATION FILED MAY 5, 1917.

1,244,368.

Patented Oct. 23, 1917.

INVENTOR.
R. PRONK.
BY HIS ATTORNEY:
A. M. Carlsen

UNITED STATES PATENT OFFICE.

RALPH PRONK, OF EDGERTON, MINNESOTA.

LITTER-CARRIER.

1,244,368.  Specification of Letters Patent.  Patented Oct. 23, 1917.

Application filed May 5, 1917. Serial No. 166,730.

*To all whom it may concern:*

Be it known that I, RALPH PRONK, a citizen of the United States, residing at Edgerton, in the county of Pipestone and State of Minnesota, have invented a new and useful Litter-Carrier, of which the following is a specification.

My invention relates to litter carriers, and the object is to so improve the portion of the track and its support on which the carrier proper is started that the carrier in passing from the cable to the support will run smoothly over the joint connecting said parts.

Figure 1:
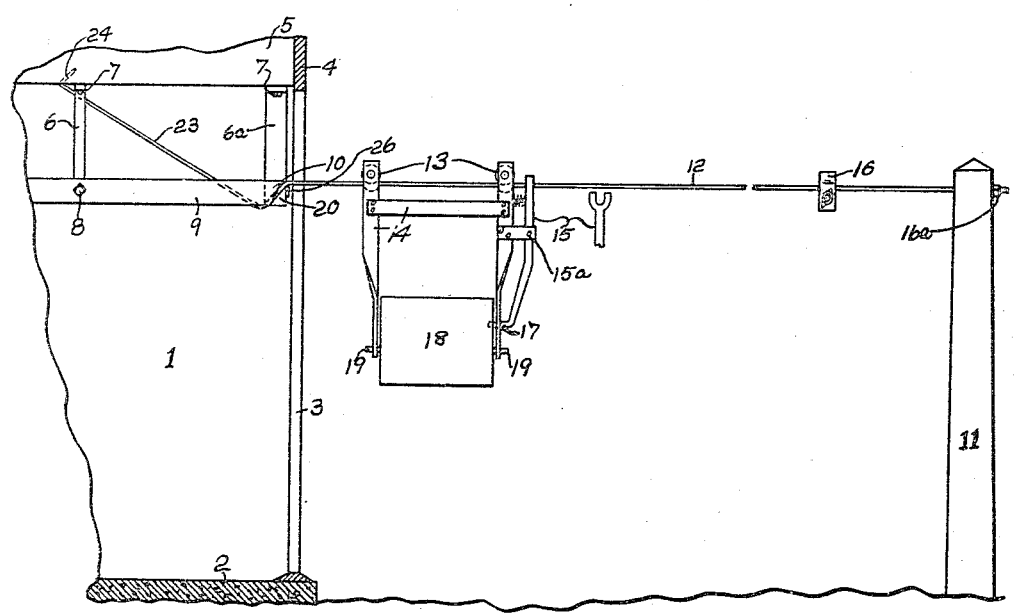
Figure 2:
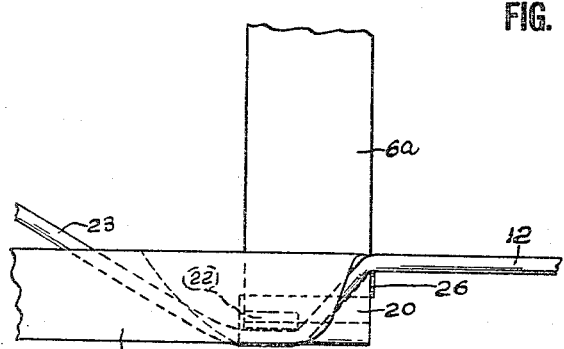
Figure 3:
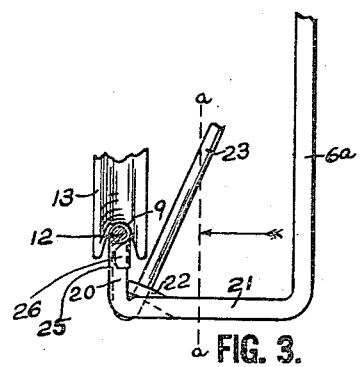
Figure 4:
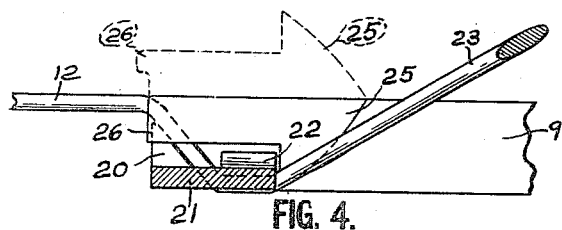

This and other objects I attain by the novel construction and arrangements of parts hereinafter fully described and claimed, and illustrated in the accompanying drawing, in which:

Figure 1 is a side elevation of a litter carrier, and its cable and other parts necessary to illustrate my invention and to show its practical relation to such parts. Fig. 2 is an enlarged detail view, more clearly showing the connection between the carriage and the cable shown in Fig. 1. Fig. 3 is a right hand elevation of Fig. 2, showing also a part of a pulley 13 in place. Fig. 4 is a sectional view on the line *a—a* Fig. 3, omitting the pulley.

Referring to the drawing by reference numerals, 1 designates a portion of a stable, having a floor 2, a doorway 3 in the wall 4, and an overhead timber 5. Secured to the timber 5 by means of brackets 6 and screws or bolts 7 and 8 is a track bar 9.

From the outer end 10 of the bar 5 to a post 11 fixed in the ground extends a track cable or wire 12, upon which ride the rollers 13 of a frame or carriage 14, which carries a lever 15 fulcrumed at 15ª and has a forked end, which, upon striking an adjustable stop 16, releases the catch 17, allowing the box 18, which is trunnioned in the frame 14 and heavier on the top, to tilt on its trunnions 19, and dump its contents.

The post end of the cable 12 may be fastened by first extending through the post and then being secured by a nut 16ª which may also serve as a cable stretcher or tightener. The other end of the cable is secured in the following manner. The lower end of the bracket or hanger 6ª has a horizontal extension 21 (as shown in Fig. 3) the end of which is formed with an upward projection 20 and a horizontal projection or lip 22. The cable 12 is bent over the top of the projection 20 and then extends down and passes under the lip 22. From this lip it extends upwardly and laterally as the arm 23 and is secured at 24 to the timber 5 so as to allow clearance for the pulleys 13 (see Fig. 3).

The end of the track bar 9 is forged or flattened out into a flap 25, as shown in dotted lines in Fig. 4, and is then folded down as shown in full lines in Fig. 4, securely holding the cable in position; the lip 26 is folded over the extension 20. Thus the joint is held in a substantial rigid position and forms a smooth connection for the rollers of the litter carrier to pass over.

In the operation the carriage normally hangs on the bar 9, in the stable, and after the box or bucket 18 is filled the carriage is given a push so it will run against the obstruction 16 and dump its load, whereupon the carriage is returned to the barn by its gravity, the cable being for that purpose inclined toward the barn.

What I claim is:

1. In a litter carrier, the combination with two stationary objects, of a track cable stretched between said objects, a frame having grooved pulleys arranged to ride on the cable and the box mounted in the frame and means for supporting the ends of said cable, said means at one end of the cable comprising a vertically flat track bar and brackets holding the same to the stationary object, one of said brackets having a horizontal arm with a horizontal and a vertical projection, the track wire extending from its point of fastening on a slant downward and under the horizontal projection, and thence upward upon the upward projection and thence outward to form the main track, said flat track bar having its upper edge in line with the top of the said main track wire, and means for holding the track wire and the track bar in said position.

2. In a litter carrier, the combination with two stationary objects, of a track cable stretched between said objects, a frame having grooved pulleys arranged to ride on the cable and a box mounted in the frame and means for supporting the ends of said cable, said means at one end of the cable comprising a vertically flat track bar and brackets holding the same to the stationary object, one of said brackets having a horizontal arm with a horizontal and vertical projection, the track wire extending from its point of fastening on a slant downward and under the horizontal projection and thence upward upon the upward projection and thence outward to form the main track, said flat track bar having its upper edge in line with the top of the said main track wire, and means for holding the track wire and the track bar in said position, the latter means comprising a flattened portion of the end of the track bar clenched about the track wire and the said projections of the bracket.

In testimony whereof I affix my signature.

RALPH PRONK.

Witnesses:
 A. H. JANSEN,
 KLAAS PRONK.